United States Patent Office 3,203,928
Patented Aug. 31, 1965

3,203,928
POLYMERIC ORGANOBORON COMPOUNDS
AND METHOD OF MAKING SAME
George W. Willcockson, Anaheim, and Joseph G. Bower, Orange, Calif., assignors to United States Borax & Chemical Corporation, Los Angeles, Calif., a corporation of Nevada
No Drawing. Filed Dec. 4, 1961, Ser. No. 157,002
11 Claims. (Cl. 260—47)

The present invention relates as indicated to a new class of polymeric organoboron compounds and has further reference to a method for preparing these polymeric compounds.

It is, therefore, the principal object of the present invention to provide a new class of thermally stable polymeric organoboron compounds.

It is further object of this invention to provide an efficient method for preparing these thermally stable polymeric compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative however, of but a few of the various ways in which the principle of the invention may be employed.

Broadly stated, the present invention comprises polymeric organoboron compounds having the recurring structural unit

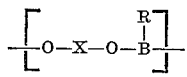

where R is a radical selected from the group consisting of alkyls of from 1 to 6 carbon atoms, phenyl and alkyl substituted phenyl, said substituents having from 1–4 carbon atoms, and X is a radical selected from the group consisting of 1,3-phenylene, 1,4-phenylene and 4,4'-biphenylene.

The present polymeric compounds are excellent adhesives and can be used for bonding together such materials as glass, wood and metal; they also find utility as binders in the preparation of fiberglass cloth laminates and they can be used as molding and casting resins. These polymeric compounds are thermally stable at temperatures up to about 500° C., and as such they will find a variety of industrial applications as protective coatings for heat sensitive materials which are to be subjected to high temperature environments.

The preparation of the polymeric organoboron compounds of the present invention can best be illustrated by the following equations:

(1)
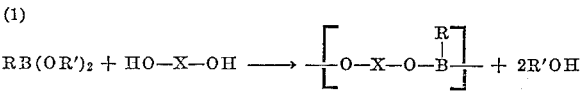

(2)
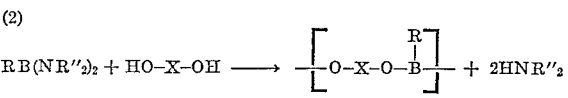

(3)
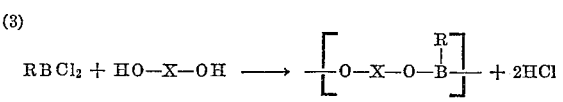

(4)
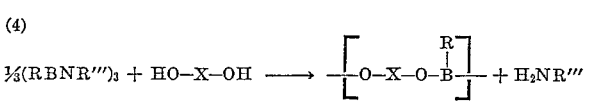

where X is a 1,3-phenylene, or a 1,4-phenylene, or a 4,4'-biphenylene radiacal, R is a lower alkyl radical of from 1 to 6 carbon atoms, or phenyl, or an alkyl substituted phenyl radical, R' is a lower alkyl radical of from 1 to 6 carbon atoms or a phenyl radical, R" is a lower alkyl radical of from 1 to 4 carbon atoms, phenyl, or alkyl substituted phenyl radicals, the substituents having from 1 to 4 carbon atoms, and R''' is a lower alkyl radical of from 1 to 4 carbon atoms or hydrogen.

As can be seen from the foregoing equations, the preparation of the present polymeric organoboron compounds is accomplished by reaction of an applicable dihydroxy reactant with a member of one of four different classes of organoboron compounds. It will be apparent to those familiar with the art that the applicable dihydroxy reactants, having the formula HO—X—OH, where X is a 1,3-phenylene, a 1,4-phenylene, or a 4,4'-biphenylene radical, are resorcinol, hydroquinone and p,p'-biphenol, respectively; all are well known and commercially available compounds.

As regards the organoboron reactants applicable to the present invention, these can be selected from any one of four different classes of organoboron compounds. The four classes of applicable organoboron compounds are the dialkoxyorganoboranes having the formula $RB(OR')_2$, the bis(diorganoamino)organoboranes having the formula $RB(NR''_2)_2$, the organodichloroboranes having the formula $RBCl_2$, and the borazoles having the formula $(RBNR''')_3$, where R, R', R" and R''' are as defined previously. All four of these classes of compounds and means for their preparation are known in the art.

The following list is illustrative of the organoboron compounds applicable to the present invention.

Dialkoxyorganoboranes, $RB(OR')_2$:
  Dimethoxyethylborane
  Diphenoxyethylborane
  Dibutoxy-n-propylborane
  Diethoxyphenylborane
  Diisopropoxyphenylborane
  Di-n-butoxytolylborane
  Di-n-propoxytolylborane
  Di(m-methylphenoxy)ethylborane Bis(diorganoamino)organoboranes, $RB(NR''_2)_2$:
  Bis(dimethylamino)phenylborane
  Bis(di-n-propylamino)phenylborane
  Bis(diisopropylamino)tolylborane
  Bis(di-n-butylamino)-n-propylborane
  Bis(diethylamino)-n-butylborane
  Bis(dimethylamino)-n-hexylborane
  Bis(dianilino)methylborane
  Bis(diisobutylamino)ethylborane Organodichloroboranes, $RBCl_2$:
  Methyldichloroborane
  Ethyldichloroborane
  Isobutyldichloroborane
  n-Propyldichloroborane
  Isoamyldichloroborane
  n-Hexyldichloroborane
  Phenyldichloroborane
  Tolyldichloroborane Borazoles, $(RBNR''')_3$:
  B-trimethylborazole
  B-tri-sec-butylborazole
  B-triphenylborazole
  B-tritolylborazole
  Hexamethylborazole
  Hexaethylborazole
  B-triphenyl-N-trimethylborazole
  B-tritolyl-N-triethylborazole
  B-trimethyl-N-triisopropylborazole
  B-triethyl-N-tri-n-propylborazole It is to be clearly understood that the foregoing list is only a partial enumeration of the organoboron compounds applicable to the present invention and is not intended to limit the invention.

The method for performing the present condensation reactions is a direct single-step process. The organoboron reactant and dihydroxy compound are combined in the presence or absence of a heat transfer medium, in an inert atmosphere. The reaction mixture is then heated under reflux, and the secondary reaction product, the alcohol, the secondary amine, the hydrogen chloride, or the primary amine, is removed as a volatile by-product. The desired polymeric organoboron compound is then recovered from the residual reaction mass by distillation of the heat transfer medium or by filtration.

For ease of recovery and to obtain a uniform heat distribution, in the preferred embodiment of the invention we perform the present condensation reactions in the presence of a heat transfer medium. The common hydrocarbon solvents, ethers and glymes, such as, for example, benzene, toluene, xylene, n-heptane, chlorobenzene, diethyl ether, dibutyl ether, diphenyl ether, tetraglyme (tetraethyleneglycol dimethyl ether), diglyme (diethyleneglycol dimethyl ether), etc. are all applicable for this use. The only requirement for the heat transfer medium is that it must be inert to the reactants.

The present condensation reactions will proceed regardless of the amount of each reactant present, however, optimum yield and optimum physical properties are achieved, when stoichiometric amounts of reactants are present. Therefore, in the preferred embodiment of the invention, the dialkoxyorganoboranes, or the bis(diorganoamino)organoboranes, or the organodichloroboranes are added to the dihydroxy compound in a 1:1 molar ratio, and when the reactants are a borazole and an applicable dihydroxy compound they are used in a 1:3 molar ratio, respectively.

So that the present invention can be more clearly understood, the following examples are given for illustrative purposes:

I. Bis(dimethylamino)phenylborane, 11.54 grams 0.0655 mole), and 7.22 grams (0.0655 mole) of hydroquinone were added to a flask containing 150 ml. of chlorobenzene in a nitrogen atmosphere. The reaction mixture was then heated under reflux for a period of about 7 hours at which time 4.45 grams (75.4% of theory) of dimethylamine had been removed. The desired white solid product was recovered from the residual reaction mass by filtration, and was then dried. The product when heated to from about 320° C. to about 340° C. evolved additional dimethylamine and changed in appearance to a light yellow glass which remained unaffected when heated to temperatures up to about 490° C. Chemical analysis of the polymeric product showed a recurring structural unit having the following empirical formula $C_{12}H_9BO_2$.

Calculated for $C_{12}H_9BO_2$: B=5.52%. Found in product: B=5.16%.

II. Bis(diethylamino) - n - butylborane, 15.92 grams (0.075 mole) and 8.26 grams (0.075 mole) of resorcinol were added to a flask containing 200 ml. of toluene in a nitrogen atmosphere. The reaction mixture was then heated under reflux for a period of about 7 hours at which time 8.48 grams (77.3% of theory) of diethylamine had been removed. The desired product, a tan solid, was recovered from the residual reaction mass by filtration, and was then dried. The product when heated to about 300° C. changed in appearance to a light yellow glass which remained unaffected when heated to temperatures up to 480° C. Chemical analysis of the final polymer showed a recurring structural unit having the following empirical formula $C_{10}H_{13}BO_2$.

Calculated for $C_{10}H_{13}BO_2$: B=6.15%. Found in product: B=5.97%.

III. Bis(diisopropylamino)phenylborane, 15.86 grams (0.055 mole) and 10.24 grams (0.055 mole) of 4,4'-biphenol were added to a flask containing 200 ml. of xylene in a nitrogen atmosphere. The reaction mixture was then heated under reflux for a period of about 8 hours at which time 8.55 grams (76.8% of theory) of diisopropylamine had been removed. The desired product, a tan solid, was recovered from the residual reaction mass by distilling off the xylene and was then dried. The product when heated to about 300° C. changed in appearance to an amber colored glass which remained unaffected when heated to temperatures up to about 500° C. Chemical analysis of the polymer showed a recurring structural unit having the following empirical formula $C_{18}H_{13}BO_2$.

Calculated for $C_{18}H_{13}BO_2$: B=3.98%. Found in product B=3.64%.

IV. Diisopropoxyphenylborane, 13.5 grams (0.0655 mole), and 7.22 grams (0.0655 mole) of hydroquinone were added to a flask containing 150 ml. of chlorobenzene in a nitrogen atmosphere. The reaction mixture was then heated under reflux for a period of about 7 hours at which time 6.69 grams (85% of theory) of isopropanol had been removed. The desired product, a white solid was recovered from the residual reaction mass by filtration and was then dried. The product, when heated to from about 290° to about 340° C., changed in appearance to a light yellow glass which remained unaffected when heated to temperatures up to about 500° C. Chemical analysis of the polymeric product showed a recurring structural unit having the following empirical formula $C_{12}H_9BO_2$.

Calculated for $C_{12}H_9BO_2$: B=5.52%. Found in product B=5.34%.

V. Diethoxymethylborane, 11.6 grams (0.10 mole) and 11.01 grams (0.10 mole) of resorcinol were added to a flask containing 200 ml. of di-n-propyl ether in a nitrogen atmosphere. The reaction mixture was then heated under reflux for a period of about 4 hours at which time 8.45 grams (91.7% of theory) of ethanol had been removed. The product, a yellow translucent glass, was recovered from the residual reaction mass by distilling off the ether and was then dried. The product, when heated to about 180° C. softened and remained in an unchanged condition when heated to temperatures up to 480° C. Chemical analysis of this polymer showed a recurring structural unit having the following empirical formula $C_7H_7BO_2$.

Calculated for $C_7H_7BO_2$: B=8.08%. Found in product: B=7.97%.

VI. Diisopropoxyphenylborane, 13.6 grams (0.066 mole) and 12.2 grams (0.066 mole) of 4,4'-biphenol were thoroughly admixed by adding them to 25 ml. of diethyl ether, and then agitating the resultant slurry. The ether was then removed by distillation and the resultant admixture was heated, in a nitrogen atmosphere, to about 200° C., over a 1 hour period at which time 10.81 grams (81% of theory) of isopropanol had been removed. The product, a tan glass, was recoverd as the pot residue. The product when heated to about 300° C. changed in appearance to an amber glass which remained unaffected when heated to temperatures up to about 500° C. Chemical analysis of this polymer showed a recurring structural unit having the following empirical formula $C_{18}H_{13}BO_2$.

Calculated for $C_{18}H_{13}BO_2$: B=3.98%. Found in product B=3.99%.

VII. B - triphenyl - N - trimethylborazole, 5.0 grams (0.0142 mole) and 4.7 grams (0.0427 mole) of hydroquinone were added to a flask containing 25 grams of diphenyl ether in a nitrogen atmosphere. The reaction mixture was then heated under reflux for a period of 5 hours at which time 0.93 gram (70.1% of theory) of methylamine had been removed. The product, a yellow glass was recovered from the residual reaction mass by distilling off the diphenyl ether at a reduced pressure and was then dried. The product when heated to temperatures up to 480° C. softened somewhat, but otherwise appeared to be unaffected. Chemical analysis of this polymeric product showed a recurring structural unit having the following empirical formula $C_{12}H_9BO_2$.

Calculated for $C_{12}H_9BO_2$: B=5.52%. Found in product B=5.39%.

VIII. Hexamethylborazole, 30.07 grams (0.182 mole) and 60.2 grams (0.547 mole) of resorcinol were added to a flask containing 200 ml. of xylene in a nitrogen atmosphere. The reaction mixture was then heated under reflux for a period of about 20 hours at which time 15.77 grams (92.8% of theory) of methylamine had been removed. The product, a yellow-amber glass, was recovered from the residual reaction mass by distilling off the xylene and was then dried. The product when heated to 190° C. softened but did not melt and there was no further apparent change in the resin when heated to 480° C. Chemical analysis of the resin product showed a recurring structural unit having the following empirical formula $C_7H_7BO_2$.

Calculated for $C_7H_7BO_2$: B=8.08%. Found in product: B=7.95%.

IX. B-tri-ni-propylborazole, 5.0 grams (0.0242 mole) and 13.52 grams (0.0726 mole) of 4,4'-biphenol were added to a flask containing 50 ml. of diglyme (diethylene glycol dimethyl ether) in a nitrogen atmosphere. The reaction mass was then heated under reflux for a period of about 6 hours at which time 1.08 grams (87.6% of theory) of ammonia had been removed. The product, a yellow glass, was recovered from the residual reaction mass by distilling off the diglyme and was then dried. The product when heated to temperatures up to about 480° softened somewhat, but otherwise appeared to be unaffected. Chemical analysis of the product showed a recurring structural unit having the following empirical formula $C_{15}H_{15}BO_2$.

Calculated for $C_{15}H_{15}BO_2$: B=4.54%. Found in product: B=4.37%.

X. A solution of 8.40 grams (0.0758 mole) of ethyldichloroborane in 20 ml. of xylene was slowly added in a nitrogen atmosphere to a slurry of 6.30 grams (0.0572 mole) of hydroquinone in 15 ml. of xylene. Evolution of hydrogen chloride gas began immediately and after heating the reaction mass slightly the theoretical amount, 4.17 grams (0.1144 mole) of hydrogen chloride had been evolved. The excess ethyldichloroborane and the xylene were then removed by distillation, and the product, an amber resin, was recovered as the pot residue. The recovered product when heated to temperatures up to about 400° C. remained unaffected. Chemical analysis of this resin showed a recurring structural unit having the following empirical formula $C_8H_9BO_2$.

Calculated for $C_8H_9BO_2$: B=7.31%. Found in product: B=7.14%.

XI. A solution of 6.78 grams (0.0612 mole) of ethyldichloroborane in 25 ml. of xylene was added slowly in a nitrogen atmosphere to a solution of 6.78 grams (0.0616 mole) of resorcinol in 15 ml. of xylene. Evolution of hydrogen chloride gas began immediately and after heating the reaction mass slightly the theoretical amount, 4.46 grams (0.1224 mole) of hydrogen chloride had been evolved. The xylene was then removed from the reaction mass by distillation, and the product, an amber resin, was recovered as the pot residue. The recovered product when heated to temperatures up to about 400° C. remained unaffected. Chemical analysis of the resin product showed a recurring structural unit having the following empirical formula $C_8H_9BO_2$.

Calculated for $C_8H_9BO_2$: B=7.31%. Found in product B=7.14%.

XII. A solution of 7.60 grams (0.0478 mole) of phenyldichloroborane in 25 ml. of xylene was added slowly in nitrogen atmosphere to a slurry of 8.90 grams (0.0478 mole) of 4,4'-biphenol in 10 ml. of xylene. Evolution of hydrogen chloride gas began immediately and after heating the reaction mass slightly the theoretical amount, 3.49 grams (0.0956 mole) of hydrogen chloride was evolved. The xylene was then removed from the reaction mass by distillation, and the product, an amber resin, was recovered as the pot residue. The recovered product when heated to temperatures up to about 430° C. remained unaffected. Chemical analysis of this polymer showed a recurring structural unit having the following empirical formula $C_{18}H_{13}BO_2$.

Calculated for $C_{18}H_{13}BO_2$: B=3.98%. Found in product B=3.79%.

Other modes of applying the principle of the invention may be employed, change being made as regards the details described, provided the features as stated in any of the following claims or the equivalent of such may be employed.

We, therefore, particularly point out and distinctly claim as our invention:

1. A solid organoboron resin of the recurring structural unit

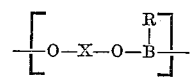

said units being linked through boron-oxygen bonds, where R is a radical selected from the group consisting of alkyls of from 1 to 6 carbon atoms, phenyl, and alkyl substituted phenyl, said substituents having from 1–4 carbon atoms and X is a radical selected from the group consisting of 1,3-phenylene, 1,4-phenylene and 4,4'-biphenylene, said resin being thermally stable at temperatures up to about 500° C.

2. A solid organoboron resin of the recurring structural unit

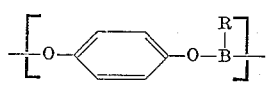

said units being linked through boron-oxygen bonds, where R is a radical selected from the group consisting of alkyls of from 1 to 6 carbon atoms, phenyl and alkyl substituted phenyl, said substituents having from 1–4 carbon atoms, said resin being thermally stable at temperatures up to about 500° C.

3. A solid organoborn resin of the recurring structural unit

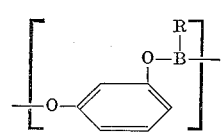

said units being linked through boron-oxygen bonds, where R is a radical selected from the group consisting of alkyls of from 1 to 6 carbon atoms, phenyl and alkyl substituted phenyl, said substituents having from 1–4 carbon atoms, said resins being thermally stable at temperatures up to about 500° C.

4. A solid organoboron resin of the recurring structural unit

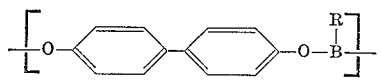

said units being linked through boron-oxygen bonds, where R is a radical selected from the group consisting of alkyls of from 1 to 6 carbon atoms, phenyl and alkyl substituted phenyl, said substituents having from 1–4 carbon atoms, said resins being thermally stable at temperatures up to about 500° C.

5. The method for preparing solid, thermally stable organoboron resins of the recurring structural unit

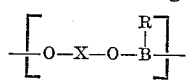

said units being linked through boron-oxygen bonds, where X is a radical selected from the group consisting of 1,4-phenylene, 1,3-phenylene, and 4,4'-biphenylene, which comprises heating under reflux in an inert atmosphere, a material selected from the group consisting of dialkoxyorganoboranes having the formula RB(OR')$_2$, bis(diorganoamino)organoboranes, having the formula

RB(NR''$_2$)$_2$ organodichloroboranes having the formula RBCl$_2$, and borazoles having the formula (RBNR''')$_3$ where R is a radical selected from the group consisting of alkyls of from 1 to 6 carbon atoms, phenyl, and alkyl substituted phenyl, said substituents having from 1 to 4 carbon atoms, R' is a radical selected from the group consisting of alkyls of from 1 to 6 carbon atoms and phenyl, R'' is a radical selected from the group consisting of alkyls of from 1 to 4 carbon atoms, phenyl, and alkyl substituted phenyl, said substituents having from 1 to 4 carbon atoms and R''' is a radical selected from the group consisting of alkyls of from 1 to 4 carbon atoms and hydrogen, with a material selected from the group consisting of hydroquinone, resorcinol and 4,4'-biphenol, removing the more volatile reaction product by distillation, heating the residual product to a temperature of at least about 290° C. and recovering the desired polymeric organoboron compound as the residue.

6. The method for preparing solid, thermally stable organoboron resins of the recurring structural unit

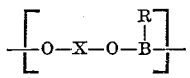

said units being linked through boron-oxygen bonds where X is a radical selected from the group consisting of 1,4-phenylene, 1,3-phenylene and 4,4'-biphenylene, which comprises heating under reflux in an inert atmosphere, in the presence of a liquid heat transfer medium which is inert to the reactants, a material selected from the group consisting of dialkoxyorganoboranes having the formula RB(OR')$_2$, bis(diorganoamino)organoboranes, having the formula RB(NR''$_2$)$_2$, organodichloroboranes having the formula RBCl$_2$, and borazoles having the formula (RBNR''')$_3$ where R is a radical selected from the group consisting of alkyls of from 1 to 6 carbon atoms, phenyl, and alkyl substituted phenyl, said substituents having from 1 to 4 carbon atoms, R' is a radical selected from the group consisting of alkyls of from 1 to 6 carbon atoms and phenyl, R'' is a radical selected from the group consisting of alkyls of from 1 to 4 carbon atoms, phenyl, and alkyl substiuted phenyl, said substituents having from 1 to 4 carbon atoms and R''' is a radical selected from the group consisting of alkyls of from 1 to 4 carbon atoms and hydrogen, with a material selected from the group consisting of hydroquinone, resorcinol and 4,4'-biphenol, and finally removing the more volatile reaction product and heat transfer medium by heating the residue to a temperature of at least about 290° C.

7. The method for preparing solid, thermally stable organoboron resins of the recurring structural unit

said units being linked through boron-oxygen bonds, which comprises heating under reflux, in an inert atmosphere and in the presence of a liquid heat transfer medium which is inert to the reactants, hydroquinone and a borazole of the formula (RBNR''')$_3$, where R is phenyl and R''' is lower alkyl, in a borazole to hydroquinone molar ratio of about 1:3, and finally removing the more volatile reaction products and heat transfer medium by heating the residue to a temperature of at least about 290° C.

8. The method for preparing solid, thermally stable organoboron resins of the recurring structural unit

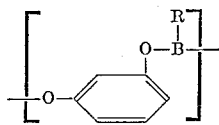

said units being linked through boron-oxygen bonds, which comprises heating under reflux, in an inert atmosphere and in the presence of a liquid heat transfer medium which is inert to the reactants, resorcinol and a borazole of the formula (RBNR''')$_3$, where R and R''' are lower alkyl, in a borazole to resorcinol molar ratio of about 1:3, and finally removing the more volatile reaction products and heat transfer medium by heating the residue to a temperature of at least about 290° C.

9. The method for preparing solid, thermally stable organoboron resins of the recurring structural unit

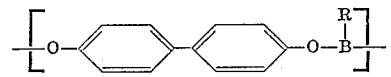

said units being linked through boron-oxygen bonds, which comprises heating under reflux, in an inert atmosphere and in the presence of a liquid heat transfer medium which is inert to the reactants, equimolar amounts of 4,4'-biphenol and a bis(diorganoamino)organoborane of the formula RB(NR''$_2$)$_2$, where R is phenyl and R'' is lower alkyl, and finally removing the more volatile reaction products and heat transfer medium by heating the residue to a temperature of at least about 290° C.

10. The method for preparing solid, thermally stable organoboron resins of the recurring structural unit

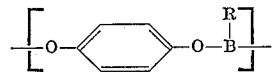

said units being linked through boron-oxygen bonds, which comprises heating under reflux, in an inert atmosphere and in the presence of a liquid heat transfer medium which is inert to the reactants, equimolar amounts of hydroquinone and dialkoxyorganoborane of the formula RB(OR')$_2$, where R is phenyl and R' is low alkyl, and finally removing the more volatile reaction products and heat transfer medium by heating the residue to a temperature of at least about 290° C.

11. The method for preparing solid, thermally stable organoboron resins of the recurring structural unit

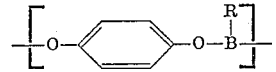

said units being linked through boron-oxygen bonds, which comprises heating under reflux, in an inert atmosphere and in the presence of a liquid heat transfer medium which is inert to the reactants, equimolar amounts of hydroquinone and an organodichloroborane of the formula RBCl$_2$, where R is lower alkyl, and finally removing the more volatile reaction products and heat transfer medium by heating the residue to a temperature of at least about 290° C.

References Cited by the Examiner

UNITED STATES PATENTS 3,014,061   12/61   Irish et al. _____ 260—162
3,042,636   7/62    Rudner et al. _____ 260—47

WILLIAM H. SHORT, *Primary Examiner.*

LOUISE P. QUAST, *Examiner.*